Patented Nov. 27, 1951

2,576,855

UNITED STATES PATENT OFFICE 2,576,855

ORGANIC MERCURY COMPOUNDS OF XANTHINES AND PROCESS OF MAKING SAME

Walther Persch, Frankfurt on the Hochst, Germany, assignor to Cassella Farbwerke Mainkur, Frankfurt, (Main)-Fechenheim, Germany No Drawing. Application November 15, 1949, Serial No. 127,509. In Germany October 1, 1948

8 Claims. (Cl. 260—253)

This invention relates to new organic mercury compounds and to a process of making same.

It is known that the reaction products of mercuric acetate and 1-allyltheobromine exhibit in aqueous solution an acidic reaction and a limited stability. Especially this acidic reaction causes complaints of bad compatibility when the product is parenterally applied as a diuretic.

I have now found that organic mercury compounds soluble in water to form solutions of neutral reaction can be produced by starting with the soluble acidic mercury addition products which are obtained by reaction of mercury salts and xanthine derivatives containing an unsaturated side chain, and then acting with these addition products on xanthine derivatives containing basic substituents.

The xanthine derivatives containing an unsaturated side chain correspond to the general formula:

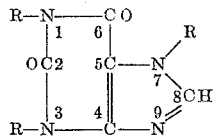

(wherein two of the R's mean methyl or ethyl, the third one an unsaturated alkyl group). The xanthine derivatives containing basic substituents correspond to the same general formula, wherein however two of the R's mean methyl or ethyl and the third one dimethylaminoethyl, diethylaminoethyl or dibenzylaminoethyl.

For the complex compounds that are the object of my present invention and which contain mercury besides the above mentioned two kinds of xanthine derivatives, a general formula cannot be given.

The complex compounds thus obtained are exceedingly well compatible and show an enhanced diuretic action.

The following examples illustrate how the invention may be practiced, but they are not intended to limit the invention of the details set forth therein; the parts are given by weight:

Example 1

50 grs. of the addition compound of mercury acetate and 1-allyl-theobromine are mixed with 44 ccm. of water and 1 gr. of 1-diethylamino-ethyltheobromine. Thereby dissolution occurs. This solution represents a 10% clear stable and neutral liquid which may directly be applied as a therapeutic of good compatibility.

By evaporating this solution in vacuo until dry the neutral solid complex compound of the acidic mercury addition compound with the basic xanthine derivative is obtained as a residue.

When in this example allyl-theobromine (1-allyl-3.7-dimethylxanthine) is replaced by 1-allyl-3.7-diethylxanthine or by 1-butenyl-3.7-dimethylxanthine similar complex compounds are obtained.

Example 2

5 grs. of the addition compound of mercury acetate and 7-allyltheophylline (7-allyl-1.3-dimethylxanthine) are dissolved with 1 gr. of 1-diethylamino-ethyltheobromine in 44 ccm. of water. The clear neutral solution thus obtained shows the above mentioned properties.

When in this example 1-diethylaminoethyl-theobromine is replaced by 1-dimethylamino-ethyl- or 1- or 3-dibenzylamino-ethyl-theobromine new complex compounds of similar properties are obtained.

I claim:

1. A process for preparing organic mercury compounds, which comprises mixing a water-soluble, acidic addition product of mercuric acetate and a xanthine derivative containing an unsaturated lower alkyl group in one of the 1-, 3- and 7-positions, with a xanthine derivative containing a dialkylaminoalkyl group in one of the 1-, 3- and 7-positions in the presence of water.

2. A process for preparing organic mercury compounds, which comprises mixing a water-soluble, acidic addition product of mercuric acetate and a xanthine derivative containing in two of the 1-, 3- and 7-positions a radical of the group consisting of methyl and ethyl and in the third position an unsaturated lower alkyl group, with a xanthine derivative containing in two of the 1-, 3- and 7-positions a radical of the group consisting of methyl and ethyl and in the third position a radical of the group consisting of dimethyl-aminoethyl, diethylaminoethyl and dibenzyl-aminoethyl in the presence of water.

3. A process as claimed in claim 2 wherein the water-soluble mercury salt is mercury acetate.

4. The water-soluble, substantially neutral organic mercury compounds obtained by the process of claim 3.

5. A process for preparing an organic mercury compound, which comprises mixing the water-soluble, acidic addition product of mercury acetate and 1-allyl-3.7-dimethylxanthine, with 1-diethylaminoethyl-3.7-dimethylxanthine in the presence of water.

6. The water-soluble, substantially neutral organic mercury compounds obtained by the process of claim 1.

7. The water-soluble, substantially neutral organic mercury compounds obtained by the process of claim 2.

8. The water-soluble, substantially neutral organic mercury compound obtained by the process of claim 9.

WALTHER PERSCH.

No references cited.